Nov. 8, 1938.  W. L. CAMPBELL  2,135,960
MEAT TENDERIZER
Filed March 23, 1937  3 Sheets-Sheet 1
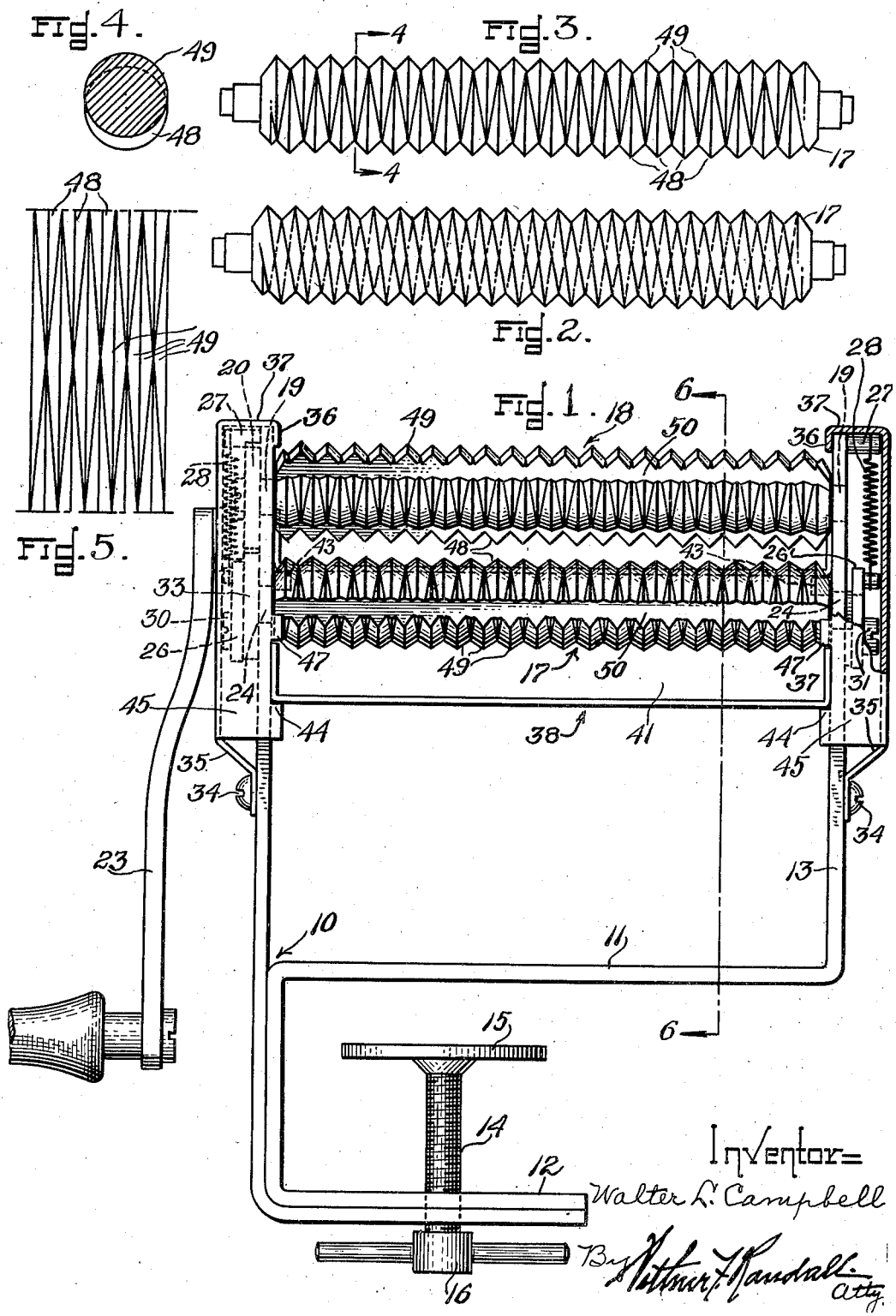
Inventor=
Walter L. Campbell
By Arthur F. Randall
Atty.

Nov. 8, 1938. W. L. CAMPBELL 2,135,960
MEAT TENDERIZER
Filed March 23, 1937 3 Sheets-Sheet 2
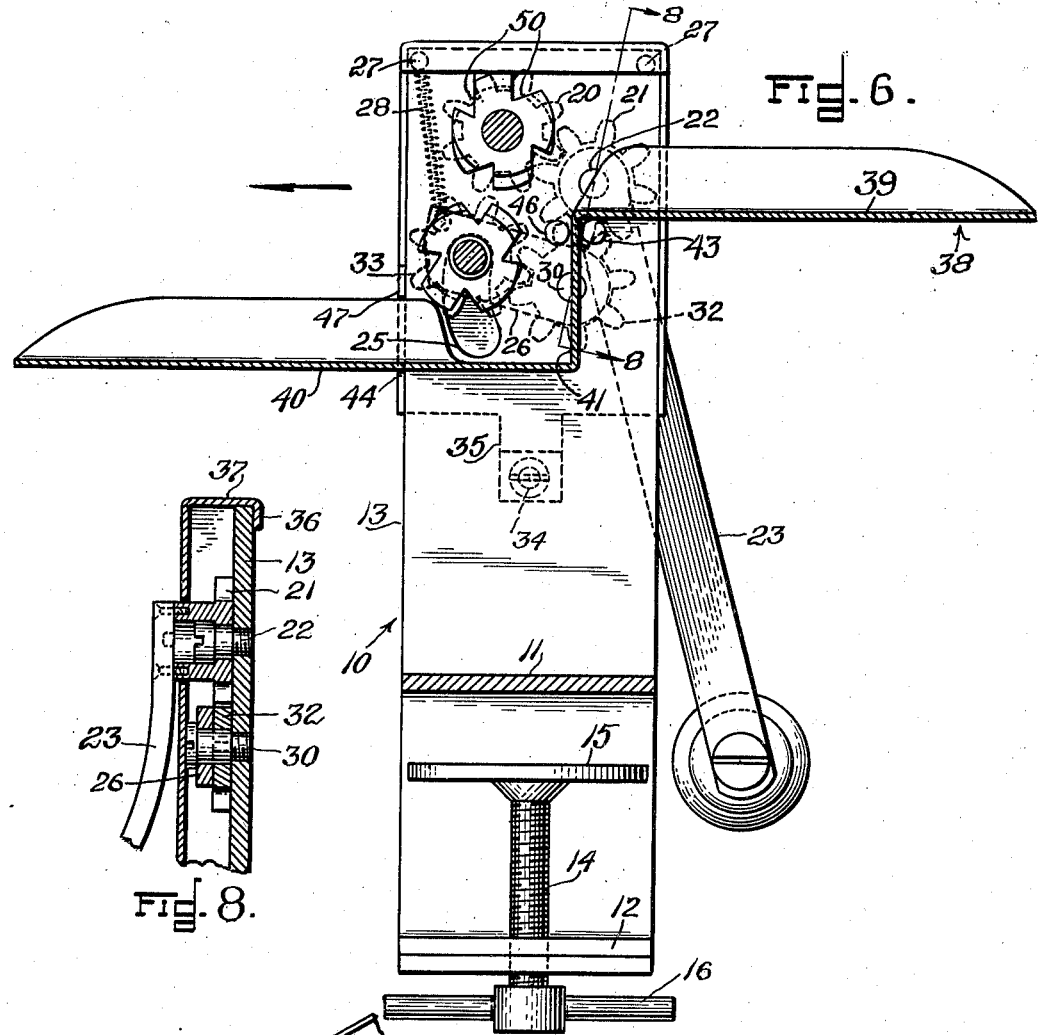
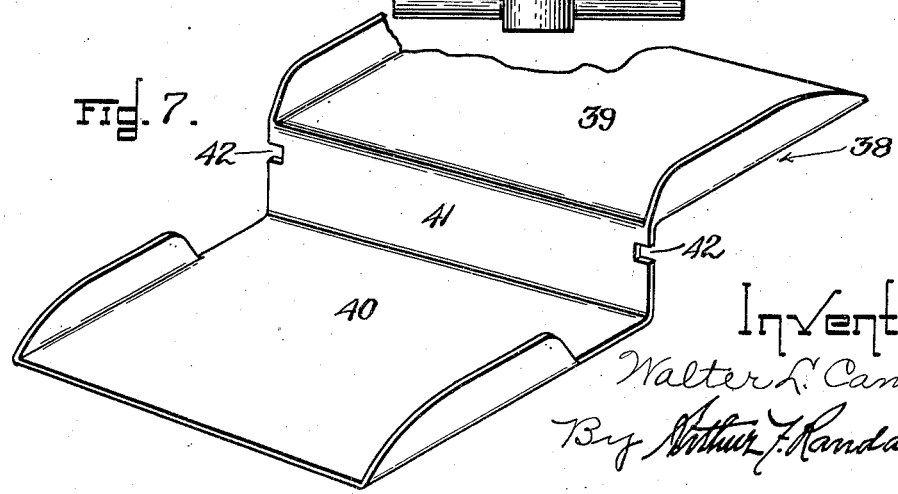
Inventor=
Walter L. Campbell
By Arthur F. Randall
atty

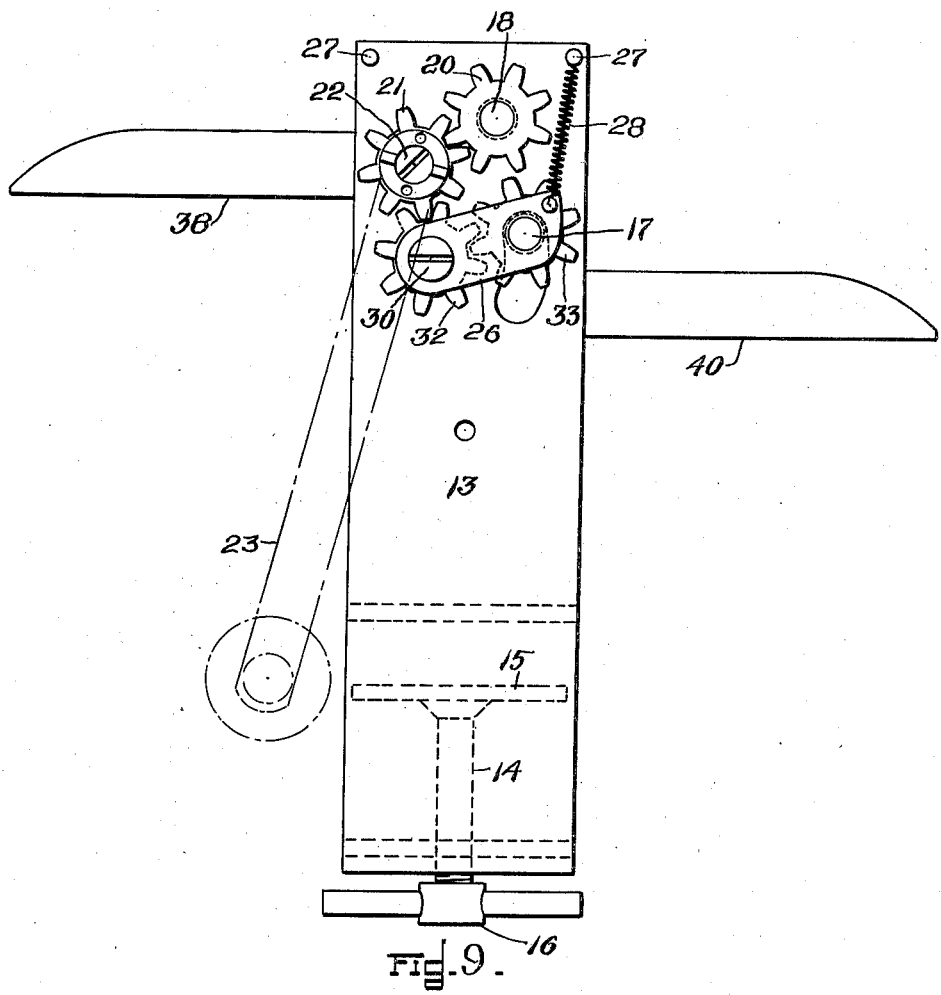

Patented Nov. 8, 1938

2,135,960

UNITED STATES PATENT OFFICE 2,135,960

MEAT TENDERIZER

Walter L. Campbell, Boston, Mass.

Application March 23, 1937, Serial No. 132,505

8 Claims. (Cl. 17—26)

My invention relates to improvements in meat tenderizers and it has for its object to provide an efficient and sanitary device of this class which can be easily, conveniently and quickly cleaned and which can be produced and sold at a low cost. It is also an object of this invention to provide an improved device of the character described which will operate equally well on thin or comparatively thick slices of meat and which will lacerate and stretch the fibers simultaneously upon opposite sides thereof.

To these ends I have provided an improved meat tenderizer having the construction and mode of operation set forth in the following description, the several novel features of the invention being separately pointed out and defined in the claims at the close thereof.

In the accompanying drawings:—

Figure 1 is a front elevation of a meat tenderizer constructed in accordance with my invention.

Figures 2 and 3 are details of one of the rolls hereinafter referred to illustrating the method of making the same and showing it in unfinished condition.

Figure 4 is a development of a portion of one of the rolls when in the condition shown in Fig. 3.

Figure 5 is a cross-sectional view of the roll when in the condition shown in Fig. 3.

Figure 6 is a section on line 6—6 of Fig. 1.

Figure 7 is a perspective view, partly broken away, of the tray or shelf hereinafter referred to.

Figure 8 is a sectional detail hereinafter referred to.

Figure 9 is an end view taken at the left of Fig. 1 and with the housing and hand lever, hereinafter referred to, removed.

The illustrated embodiment of my invention comprises a frame 10 made from two metal strips bent into the desired shapes and permanently fashioned together by spot welding or otherwise. This frame is made with a horizontal base portion 11 to fit flatwise upon the top of a table, shelf or similar support; a jaw 12 disposed below base 11 and spaced apart therefrom to provide a yoke to embrace the marginal portion of the table or the like, and a pair of parallel spaced apart upstanding posts 13, 13.

The jaw 12 is made with a threaded aperture within which is mounted a clamping screw 14 having a head 15 rotatably mounted as usual upon the upper end thereof and provided at its lower end with a handle 16 by means of which it is manually operated. Thus the device as shown is an attachment for application to the top of a table or the like to which it is rigidly held clamped while in use by screw 14.

Between the two posts 13 are two rolls 17 and 18, one of which is disposed above the other. The upper roll 18 is made at its opposite ends with trunnions 19 journaled in fixed bearings provided in said posts, one of said journals extending through the proximate post 13 to the outer side thereof where it has fixed on it a gear 20 in mesh with a gear 21 that is rotatably supported by a stud shaft 22 projecting from said post 13. This gear 21 is made with a hub to which is fastened a crank 23, Fig. 8.

The lower roll 17 is made at its opposite ends with trunnions 24 extending through arcuate slots 25 formed in posts 13 and journaled in bearings provided in a pair of pivoted arms 26 and 26'. To each arm 26 and 26' is fastened one end of a coiled spring 28 which extends upwardly therefrom to a stud 27 projecting from the proximate post 13 and with which its opposite end is connected. These springs yieldingly support the lower roll and the upper ends of the arcuate slots 25 serve as stops to limit the upward movement of said roll under the influence of the springs.

The arm 26 is pivotally supported by a stud-screw 30, Fig. 8, a threaded hole provided in the outer end of a fixed stud shaft 30 projecting from the outer side of the proximate post 13 while the arm 26' is likewise pivotally supported by a stud-screw 31 projecting from the other post 13. The stud screws 30 and 31 are axially alined.

The stud screw 30 rotatably supports an intermediate gear 32 which is in mesh with the gear 21 and also with a gear 33 fixed on one of the trunnions of lower roll 17. It will thus be clear that rotation of crank 23 in a right hand direction acts through the above described gearing to rotate the rolls in a manner to cause them to propel the meat between them in the direction of the arrow in Fig. 6.

The post 13 adjacent to the handle 23 is made at its upper end with a compartment within which is inclosed the gearing, the arm 26 and its spring 28, while the opposite post 13 is also made at its upper end with a similar compartment within which is inclosed the arm 26' and its spring 28. These compartments are provided by two sheet metal box-like housings 37 one of which is fastened to the outer side of each post 13 by means of a screw 34 occupying an aperture provided through a leg 35 projecting downwardly from the lower end of the outer wall of the housing.

Each post 13 is provided adjacent to its upper end and upon its outer side with two of the studs 27, Fig. 6, one near one side of the post and the other near the opposite side thereof, and the outer wall of the sheet metal housing bears at its upper end against the outer ends of these studs which thus serve as spacers, while the top wall of the housing is supported by the upper end of its post 13 on which it rests, said top wall being made along its inner side with a depending marginal flange 36 which holds the housing immovable against the outer ends of the studs 27.

The outer wall of the housing 37 that is adjacent to the handle 23 is made with an aperture that is occupied by the hub of the gear 21 to which hub the handle 23 is fastened.

When it is desired to have access to the parts inclosed by the housings 37 that is adjacent to the handle 23 the latter and the proximate screw 34 are removed which leaves said housing free to be lifted off from its post. The opposite housing 37 is freed for removal merely by removing its screw 34.

To support the steak or slice of meat while it is being operated upon I provide a sheet metal shelf or tray member that is indicated generally at 38 and which occupies a position between the posts 13. This member is stepped transversely adjacent to its middle to provide an upper horizontal shelf 39 which supports the meat and directs it into the space between the rolls, and a lower horizontal shelf 40 disposed below the level of the lower roll 17 and upon the delivery side thereof so as to receive and support the meat as it emerges from between the rolls.

These two shelves are connected by a transverse vertically disposed intermediate wall portion 41 whose opposite side marginal portions are formed with notches 42, Fig. 7, which, as about to be described, serve as passageways.

The tray member 38 is removably supported by short studs 43 projecting from the inner sides of the oppositely disposed posts 13, and by ledges or shoulders 44 provided upon the inner marginal portions of the side walls 45 of the housings 37, the shelf 39 resting upon the studs 43 and the shelf 40 resting upon the ledges or shoulders 44. It will therefore be clear that by lifting the shelf 39 slightly the studs 43 and notches 42 may be brought into register whereupon the member 38 may be moved toward the right, Fig. 6, and removed from the machine for cleaning. In replacing the member 38 its shelf 40 is shoved into position between the posts on top of the shoulders 44, Fig. 1, until the wall 41 bears against the studs 43, then the wall is moved vertically to bring the notches 42 and studs 43 into register which permits further inward movement of the member 38 until the wall 41 passes the studs 43. The shelf 39 can then be lowered on to said studs 43. When the shelf 39 is thus lowered on to studs 43 one end of wall 41 occupies a position between the adjacent stud 43 and a stop boss 46, Fig. 6, projecting from the adjacent post 13 thus securing the shelf member in its operative position.

Each shelf 39 and 40 is made with vertical meat-guiding side walls and the oppositely disposed side walls of the shelf 40 are disposed immediately beneath inwardly projecting lugs or shoulders 47, Fig. 1, provided upon the side walls 45 of the housings 37 which lugs or shoulders co-operate with the shoulders 44 to hold the shelf 40 against vertical displacement in either direction.

Each roll 17 and 18 may be cast, or it may be shaped from an originally cylindrical length of metal bar stock. If the latter method of production is employed the intermediate meat-engaging portion is first turned down in a lathe to the desired diameter. Then a single right hand V-thread of appropriate size is cut from end to end of said intermediate portion as shown by full lines in Fig. 2, after which a single left hand V-thread of the same size is cut from end to end thereof as indicated by broken lines in Fig. 2 and as shown by full lines in Fig. 3.

As a result of this procedure two longitudinal rows of teeth 48 and 49 are created which are disposed upon opposite sides of the axis of the roll with the teeth of one row alternating longitudinally with those of the opposite row. A development of the surface of the roll at this stage in its production is shown in Fig. 5 and an enlarged cross-sectional view thereof on a plane co-incident with the crest of a tooth is shown in Fig. 4.

After threading the roll as just described I may, as in the illustrated preferred form of my invention, provide the same with a plurality of longitudinal channels 50 thereby creating a plurality of longitudinal toothed vanes as shown, the said channels preferably being deeper than the threads.

In using my new tenderizer the piece or slice of meat is placed upon the shelf 39 and slid forward thereon to the rolls 17 and 18. Then as the handle 23 is turned in a right hand direction the meat is drawn between the rolls and delivered on to the shelf 40, the lower roll fitting itself to the thickness of the meat and being at all times yieldingly urged against the same to cause the teeth of both rolls to embed themselves in the latter.

During the passage of the meat between the rolls it is positively moved forward by the vanes referred to while the teeth at the outer ends thereof penetrate the meat and their sharp crests sever any small tendons encountered, the teeth of the two rolls acting simultaneously upon opposite sides of the meat with a tendency to stretch the same in opposite directions.

What I claim is:—

1. A meat tenderizer comprising a frame including a base provided with a pair of spaced apart uprights; a pair of meat-engaging rolls disposed between said uprights, one above the other, one of said rolls being rotatably supported at its opposite ends by said uprights; a pair of arms pivotally mounted on said uprights by which the other roll is rotatably supported at its opposite ends so that it can swing with said arms toward and from said first-mentioned roll; means for yieldingly urging said last-mentioned roll and its supporting arms toward the other roll, and driving mechanism connected with both of said rolls for positively rotating both rolls in unison to cause the latter to propel the meat between them and simultaneously act thereon.

2. A meat tenderizer comprising a frame including a base provided with a pair of spaced apart uprights; a pair of meat-engaging rolls disposed between said uprights, one above the other, one of said rolls being rotatably supported at its opposite ends by said uprights; a pair of arms pivotally mounted on said uprights and by which the other roll is rotatably supported at its opposite ends so that it is normally free to swing with said arms toward and from said first-mentioned roll; means for yieldingly urging said last-mentioned roll and its supporting arms toward the other roll; a train of gears connecting said two rolls to cause the latter to rotate in opposite directions and in unison, said train including a gear fast with said swinging roll and an intermediate gear meshing therewith that is supported to rotate on an axis coincident with the axis on which said arms swing, and means for actuating said train of gears.

3. A meat tenderizer comprising a frame including a base provided with a pair of spaced apart uprights each of which latter is constructed at its upper end with a box-like compartment; a pair of meat-engaging rolls disposed between said uprights, one above the other, one of said rolls being rotatably supported at its opposite ends by said uprights; a pair of arms pivotally mounted on said uprights by which the other roll is rotatably supported at its opposite ends so that it is normally free to swing with said arms toward and from said first-mentioned roll; spring means for yieldingly urging said last-mentioned roll and its supporting arms toward the other roll; a train of gears connecting said two rolls to cause the latter to rotate in opposite directions and in unison, said train including a gear fast to said swinging roll and an intermediate gear meshing therewith that is supported to rotate on an axis coincident with the axis on which said arms swing, and means for actuating said train of gears, said spring means, said swinging arms and said train of gears being housed within said compartments.

4. A meat tenderizer constructed in accordance with claim 3 and wherein the compartment of each upright is defined in part by a sheet metal box-like housing member disposed upon the outer side of its upright with its upper end portion removably interlocked with and supported by the upper end of its upright, and wherein means is provided removably fastening the lower end portion of said housing member to its upright.

5. A meat tenderizer comprising a frame including a base provided with a pair of spaced apart uprights each of which latter is constructed at its upper end with a compartment that is defined in part by a sheet metal box-like housing member removably secured in position upon the outer side of its upright and one of said members having its outer wall made with an aperture; a pair of meat-engaging rolls disposed between said uprights, one above the other, one of said rolls being rotatably supported at its opposite ends by said uprights; a pair of arms pivotally mounted on said uprights and by which the other roll is rotatably supported at its opposite ends so that it can swing with said arms toward and from said first-mentioned roll; spring means for yieldingly urging said last-mentioned roll and its supporting arms toward the other roll; a train of gears connecting said two rolls to cause the latter to rotate in opposite directions and in unison, said train including a gear fast to said swinging roll and an intermediate gear meshing therewith that is supported to rotate on an axis coincident with the axis on which said arms swing, and said train of gears being disposed within the box-like housing member whose outer wall is made with said aperture with one of the gears of said train registering with the latter, and a crank-handle disposed outside of said apertured housing member and removably connected with said last-mentioned gear through said aperture, said spring means and said swinging arms being disposed within said compartments.

6. A meat tenderizer comprising a frame including a base provided with a pair of spaced apart uprights; a pair of meat engaging rolls rotatably supported one above the other in position between said uprights; a single shelf member disposed between said uprights and stepped near its middle, said member occupying a position below said rolls and extending beyond the opposite sides thereof so as to provide a relatively high shelf portion at one side of said rolls by which the meat is supported as it is delivered to the latter and a lower shelf portion at the opposite sides of said rolls which extends beneath said two rolls and on to which the meat is delivered as it emerges from between said rolls, and means removably securing said shelf member in position between said uprights.

7. A meat tenderizing roll comprising a meat-engaging portion having the shape and configuration such as is produced from a cylinder formed with intersecting right-hand and left-hand threads throughout the full length thereof and with a plurality of longitudinal channels extending throughout the full length thereof and crossing both of said threads.

8. A meat tenderizing roll comprising a meat-engaging portion having the shape and configuration such as would be produced by forming a cylinder with intersecting right-hand and left-hand V-threads throughout the full-length thereof and with a plurality of longitudinal channels of greater depth than said threads and extending throughout the full length thereof and crossing both of said threads.

WALTER L. CAMPBELL.